United States Patent [19]

Pickett et al.

[11] Patent Number: 5,264,164
[45] Date of Patent: Nov. 23, 1993

[54] METHOD OF CONTROLLING GLOSS ON EXTRUDATE

[75] Inventors: Thomas J. Pickett; Edward J. Wenzel, both of Troy; Donald L. Franck, Warren, all of Mich.; John P. Kratzer, deceased, late of Trenton, N.J., by Margaret T. Kratzer, executor

[73] Assignee: General Motors Corporation, Detroit, Mich.

[21] Appl. No.: 28,751

[22] Filed: Mar. 8, 1993

Related U.S. Application Data

[63] Continuation of Ser. No. 827,662, Jan. 29, 1992, abandoned.

[51] Int. Cl.$^5$ .............................................. B29C 47/88
[52] U.S. Cl. .................... 264/40.6; 264/177.19; 264/209.7; 264/211.12; 264/211.2; 425/379.1
[58] Field of Search .......... 264/25, 40.6, 40.7, 264/177.19, 209.7, 210.5, 211.12, 211.2; 425/378.1, 379.1, 174

[56] References Cited

U.S. PATENT DOCUMENTS

| | | | |
|---|---|---|---|
| 2,583,329 | 1/1952 | Eckert | 264/25 |
| 2,583,330 | 1/1952 | Eckert | 425/467 |
| 2,791,801 | 5/1957 | Szantay | 264/25 |
| 3,221,084 | 11/1965 | Peticolas | 425/174 |
| 4,088,434 | 5/1978 | Fukuda et al. | 264/209.7 |
| 4,842,504 | 6/1989 | Bentivoglio et al. | 425/143 |
| 5,132,062 | 7/1992 | Brambilla | 264/209.7 |

*Primary Examiner*—Jill L. Heitbrink
*Attorney, Agent, or Firm*—George A. Grove

[57] ABSTRACT

A method of using a plastic extruder equipped with an extrusion die and a gloss controlling auxiliary die to produce an extrudate of polymeric material having controlled gloss appearance comprising the steps of first extruding an extrudate of polymeric material through the extrusion die and then passing the extrudate immediately after exiting from the extrusion die through a gloss controlling auxiliary die which is kept at a temperature either higher or lower than the temperature of the extrusion die.

8 Claims, 2 Drawing Sheets

METHOD OF CONTROLLING GLOSS ON EXTRUDATE

This is a continuation of application Ser. No. 07/827,662 filed on Jan. 29, 1992.

FIELD OF THE INVENTION

This invention generally relates to a method of extruding an extrudate of polymeric material and, more particularly, relates to a method of extruding an extrudate having a controlled gloss finish on its surface by passing it through an auxiliary gloss control die immediately after exiting from a conventional extrusion die.

BACKGROUND OF THE INVENTION

Profiled extrudate of polymeric materials are widely used in automobile body applications such as molding pieces. For instance, body side moldings or wheel well moldings are frequently used to protect a vehicle body from impact damage and to protect edges of sheet metal panels from corrosion. Most of these molding pieces are extruded of thermoplastic materials such as PVC (polyvinyl chloride), thermoplastic rubber, thermoplastic urethane, or other flexible polymeric materials. PVC is one of the most widely used materials for its low cost and good physical properties.

Molding pieces such as body side moldings may be extruded of a plastic material alone or extruded of a plastic material on a metal reinforcing substrate by an extrusion coating process. In an extrusion coating process where plastic materials are combined with a more rigid substrate, a cross-head extrusion technique is used in which a continuous length of metal reinforcing substrate is pulled through an extrusion die at 90° angle to the direction of the plastic flow while molten plastic material is being extruded onto the metal substrate. The metal reinforcing substrate is usually cleaned and dried through a multi-station process and formed by a series of metal roll formers prior to the entry into the extrusion die.

In the manufacturing of automobile body side moldings, the aesthetic appearance of the molding is one of the most important criteria that must be satisfied. In the extrusion of vinyl or vinyl/metal substrate reinforced molding pieces, the quality of the surface appearance of the molding pieces obtained is dependent upon many variables. For instance, these variables include the material composition, the extrusion temperature, the extrusion pressure, the extrusion rate, the cooling rate, etc. When a high gloss surface appearance is desired on a PVC molding piece, two common approaches are traditionally used.

First, a high gloss film may be permanently laminated to the outer periphery of a molding piece. This approach, even though producing an aesthetically pleasing appearance, has the drawback of cost penalty due to the high cost incurred in using high gloss films. Moreover, laminated molding pieces have potential de-lamination problems, especially when the molding pieces are subjected to severe environmental exposures.

The second approach of achieving a high gloss surface appearance on a PVC molding is by removably laminating a smooth film to the surface of the molding piece immediately after extrusion and then stripping off the film after the molding piece is cooled to room temperature. This process is described in detail in U.S. Pat. No. 4,849,045 assigned to the same assignee as the present invention. In this method, even though a smooth high gloss surface can be obtained, some additional processing parameters must be carefully observed. Moreover, only a single gloss level may be achieved by the use of a particular film having a fixed surface finish. To obtain a different gloss appearance, a different type of film must be used.

It is, therefore, an object of the present invention to provide a method of producing extrudates of polymeric materials having a desirable surface gloss finish.

It is another object of the present invention to provide a method of producing extrudates of polymeric materials having either an enhanced or reduced surface gloss finish.

It is a further object of the present invention to provide a method of producing extrudates of polymeric materials having either an enhanced or reduced surface gloss finish by simply varying some processing conditions.

It is yet another object of the present invention to provide a method of producing extrudates of polymeric materials having either an enhanced or reduced surface gloss finish without requiring a lamination process.

SUMMARY OF THE INVENTION

The aforementioned objects can be achieved by the practice of our novel method of controlling gloss on extrudates. In our method, immediately after an extrudate exits from a conventional extrusion die, it is passed through a gloss controlling auxiliary die preset at a temperature either higher or lower than the temperature of the extrusion die such that extrudate with either enhanced or reduced gloss appearance can be produced. To obtain an extrudate with enhanced gloss appearance, the temperature of the gloss controlling auxiliary die must be higher than that of the extrusion die. On the contrary, to obtain an extrudate with reduced gloss appearance, the temperature of the gloss controlling auxiliary die must be lower than that of the extrusion die.

In practice, a gloss controlling auxiliary die is mounted directly to the conventional extrusion die acting almost as an extension to the extrusion die with the exception that a sufficient insulating material is provided in-between the two dies. A completely independent heating device and temperature controlling device are provided to the auxiliary die such that its temperature can be controlled independently from that of the conventional extrusion die. The insulating material provided in-between the auxiliary die and the extrusion die must be efficient enough as to substantially prevent heat flow from either of the dies to the other.

The die opening in the auxiliary die has exactly the same profile as that of the extrusion die except that it is normally one ten-thousandths of an inch larger than the opening in the extrusion die. This prevents any dragging of the extrudate in the auxiliary die which in turn may produce shock lines on the extrudate. We have discovered that to obtain an extrudate with enhanced or reduced gloss appearance, a temperature increase or decrease of 20° to 50° F. in the auxiliary die from that of the extrusion die may be necessary.

BRIEF DESCRIPTION OF THE DRAWINGS

Further objects, features and advantages of this invention will become apparent from consideration of the following description, the appended claims and the accompanying drawings in which:

DETAILED DESCRIPTION OF THE PREFERRED EMBODIMENT

Previous attempts to utilize increased heat in a conventional extrusion die to improve the gloss appearance have failed. Additional heat incorporated into a conventional extrusion die has caused burning of the polymeric material and degradation of part quality and appearance.

Figure 1:
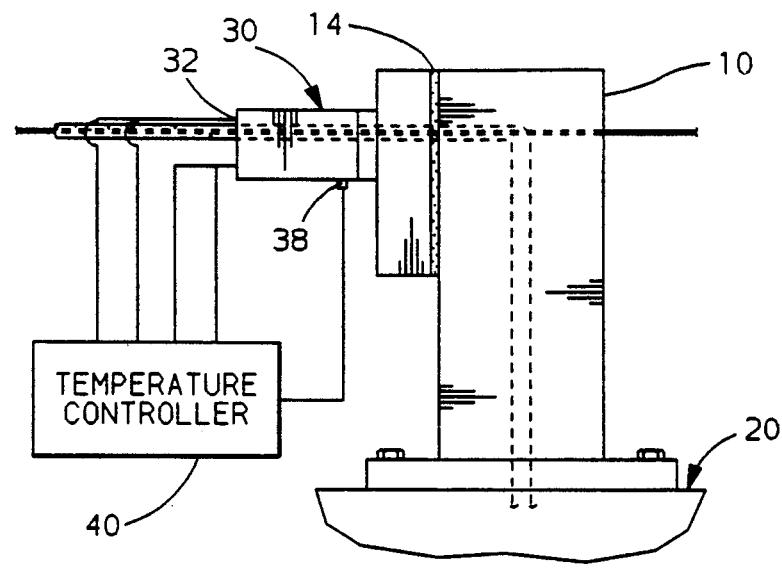
FIG. 1 is a schematic showing the arrangement of the gloss controlling auxiliary die mounted to the extrusion die of an extruder.

In our preferred embodiment, a PVC extrudate is first made by extrusion coating a PVC resin composition onto a continuous length reinforcing metal substrate through a conventional cross-head extrusion die and immediately thereafter, passing the extrudate through a gloss controlling auxiliary die. This is shown in FIG. 1 where a conventional extrusion die 10 is mounted on extruder 20. A gloss controlling auxiliary die 30 is mounted to the extrusion die 10 with insulating material 14 in-between. Cartridge type heaters 32 inserted in the auxiliary die 30 are used to provide heat to the auxiliary die through a temperature controller 40. The insulating material 14 in-between the extrusion die and the auxiliary die can be made of an asbestos material or any other heat-insulating material that is efficient in preventing substantially any heat flow between the extrusion die 10 and the auxiliary die 30.

Figure 2:
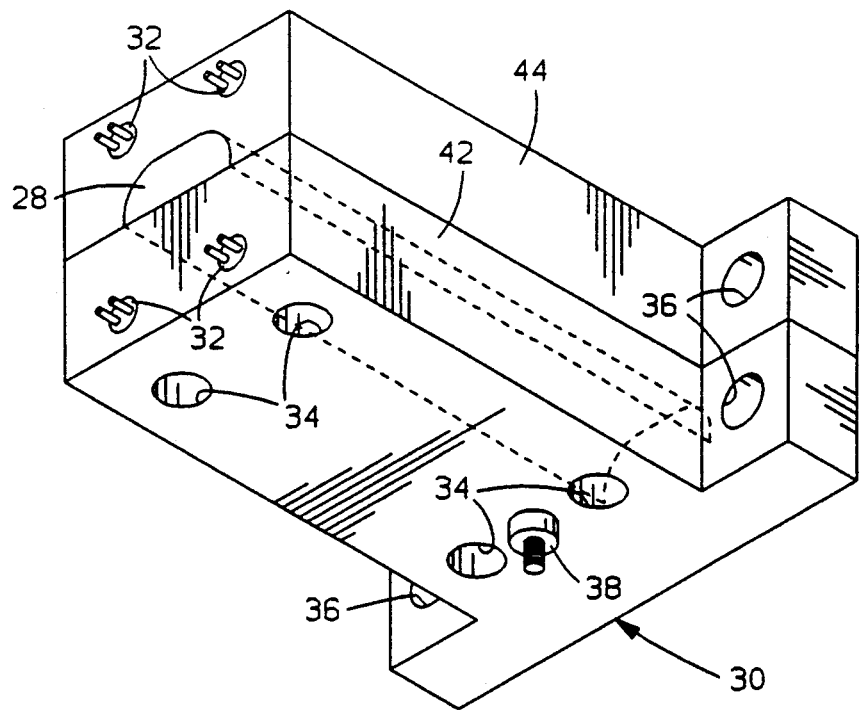
FIG. 2 is an enlarged perspective view of the gloss controlling auxiliary die.

An enlarged perspective view of the gloss controlling auxiliary die 30 is shown in FIG. 2. It can be seen that the auxiliary die 30 is assembled together of two die halves, the upper die 44 and the lower die 42 by bolts (not shown) through assembly holes 34. In this specific embodiments, four cartridge heaters 32 are utilized to heat the auxiliary die 30. A thermocouple 38 is installed inside the lower die block 42 for accurate control of the die temperature. The auxiliary die 30 is mounted through four mounting holes 36 to the conventional extrusion die 10 as shown in FIG. 1. The die opening 28 in this specific embodiment was cut one ten-thousandths of an inch larger than the opening in the extrusion die 10. This is desirable to prevent any type of drag phenomenon which may cause extrusion defects such as shock lines on the surface of the extrudate.

We have discovered that a 20 to 50 percent increase or decrease in gloss level can be obtained by using our novel gloss controlling auxiliary die. Conductive heat by contacting with the auxiliary die on the surface of the extrudate provides a wide range of gloss levels obtainable. It should be emphasized that a good insulation between the auxiliary die and the extrusion die must be provided such that substantially no heat flow can occur between the two dies. In our preferred embodiment, the auxiliary die 30 is constructed of 440 stainless steel with thermostatically-controlled heating cartridges 32 and independent temperature controller 40. The length of the die 30 is approximately 2.5 inches. We have discovered that the length of the auxiliary die required is dependent on the extrusion line speed and the gloss level desired. If higher extrusion line speed and higher gloss level is desired, the length of the auxiliary die can be as long as five inches. At lower extrusion line speed and lower gloss level, an auxiliary die length as short as one inch may be sufficient. The interior surface of the die opening 28 is a matched profile to the extrusion die with one ten-thousandths of an inch additional part clearance. The inner surface of the die opening 28 in our auxiliary die 30 comes in contact with the PVC extrudate is highly polished to an 8 to 12 micron finish.

The gloss readings on the surface of the extrudates were performed by using a Glossgard ® II 60° Glossmeter manufactured by Pacific Scientific Gardner/Neotec division.

We have discovered that there is a linear relationship between the gloss level and the temperature of the extrudate surface. Both heat and length of the auxiliary die contribute to the surface characteristics of the finished extrudate. We have discovered that by using a 2.5 inch long auxiliary die, a 25 percent increase in the temperature of the auxiliary die (of the melt temperature of PVC) will produce an 80 gloss surface.

Figure 3:
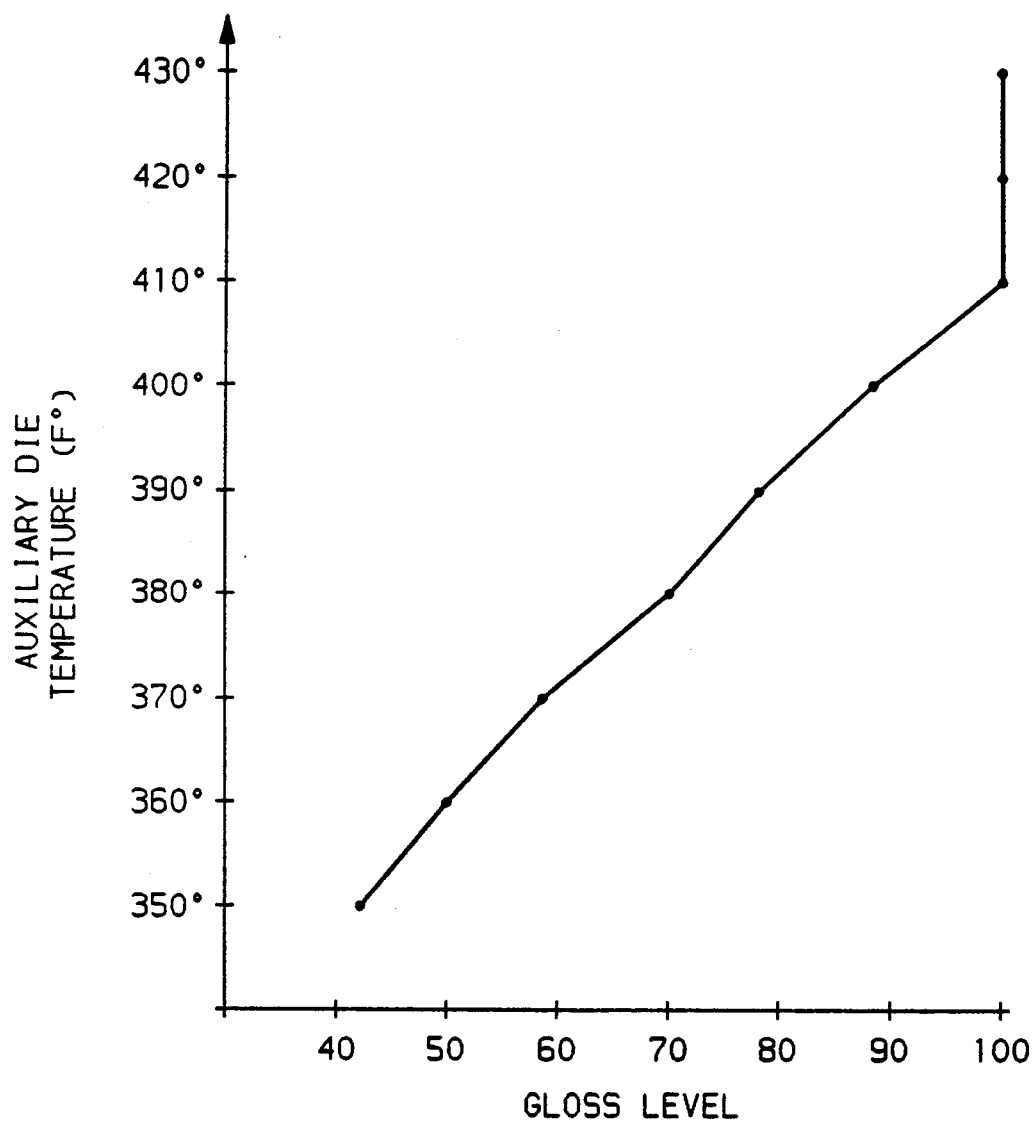
FIG. 3 is a graph showing the relationship of the auxiliary die temperature to the gloss level obtained on a PVC extrudate.

The effect of the auxiliary die temperature on the gloss level obtained on PVC material is shown in FIG. 3. A linear relationship between the die temperature and the gloss is observed up to a die temperature of approximately 410° F. At temperatures above 410° F., the PVC material has a tendency of burning and degradation. At the temperature range we have experimented, i.e., between 350° F. to 410° F., the surface gloss level of a PVC extrudate can be accurately controlled between 40 to 100 gloss readings.

It is, therefore, possible to use our novel gloss controlling auxiliary die by either increasing or decreasing the temperature setting of the die to obtain the exact gloss level required. For instance, to increase the gloss levels from 60 to 80, the auxiliary die temperature needs to be increased from 370° F. to 390° F. Similarly, when a mat finish or non-glossy surface is desired, the temperature of the auxiliary die can be decreased accordingly by following the chart in FIG. 1.

The method of the present invention has been described in an illustrative manner. It is to be understood that the terminology which has been used is intended to be in the nature of words of description rather than of limitation.

The embodiments of the invention in which an exclusive property or privilege is claimed are defined as follows:

1. In a method of heating a thermoplastic polymeric material to a temperature at which it is extrudable and continuously extruding the heated material through an open-ended extrusion die to produce a solid strip of a cross-sectional profile defined by said die and having at least one surface intended to be a decorative surface, the improvement comprising further treating at least a said decorative surface to produce a predetermined gloss level, said improvement comprising the steps:

passing the strip as it issues from said extrusion die through a second die of cross-sectional shape and size to receive the strip without further deformation of the profile but having a polished die surface to slidingly engage the decorative surface for the transfer of heat by thermal conduction with it and controlling the temperature of the second die independently of the temperature of the extrusion die so as to promote heat transfer with the decorative surface to effect a gloss level of the surface that is different from its gloss level as it emerges from the extrusion die.

2. A method as recited in claim 1 in which the temperature of the second die is controlled so as to heat the decorative surface to increase its gloss level with respect to such level as it emerges from the extrusion die.

3. A method as recited in claim 1 in which the temperature of the second die is controlled so as to cool the decorative surface to decrease its gloss level with respect to such level as it emerges from the extrusion die.

4. A method as recited in claim 1 where the thermoplastic polymeric material comprises polyvinyl chloride.

5. In a method of heating a thermoplastic polymeric material to a temperature at which it is extrudable and continuously extruding the heated material through an open-ended extrusion die at a predetermined linear rate to produce a solid strip of a cross-sectional profile defined by said die and having at least one surface intended to be a decorative surface, the improvement comprising further treating at least a said decorative surface to produce a predetermined gloss level, said improvement comprising the steps:

passing the strip as it issues from said extrusion die through a second die of cross-sectional shape and size to receive the strip without further deformation of the profile and having a polished die surface along the length of the second die to slidingly engage the decorative surface for the transfer of heat by thermal conduction with it and controlling the temperature of the second die independently of the temperature of the extrusion die so as to promote heat transfer with the decorative surface along said polished die surface to effect a gloss level of the surface that is different from its gloss level as it emerges from the extrusion die, the length of said polished die surface being a function of said linear extrusion rate to permit sufficient heat transfer to effect said gloss level.

6. A method as recited in claim 5 in which the temperature of the second die is controlled so as to heat the decorative surface to increase its gloss level with respect to such level as it emerges from the extrusion die.

7. A method as recited in claim 5 in which the temperature of the second die is controlled so as to cool the decorative surface to decrease its gloss level with respect to such level as it emerges from the extrusion die.

8. A method as recited in claim 5 where the thermoplastic polymeric material comprises polyvinyl chloride.

* * * * *